United States Patent [19]

Damico

[11] 4,132,834

[45] Jan. 2, 1979

[54] DRY TONER ELECTROFAX PAPER

[75] Inventor: George L. Damico, Tyrone, Pa.

[73] Assignee: Westvaco Corporation, New York, N.Y.

[21] Appl. No.: 856,859

[22] Filed: Dec. 2, 1977

[51] Int. Cl.[2] .......................... G03G 5/08; G03G 5/09; B32B 29/06

[52] U.S. Cl. .......................................... 428/511; 96/1.7; 96/1.8; 428/533; 428/537; 428/539; 428/913

[58] Field of Search ......................... 96/1.8, 1.5 R, 1.7; 428/537, 539, 533, 913, 511

[56] References Cited

U.S. PATENT DOCUMENTS

| | | | |
|---|---|---|---|
| 3,467,497 | 9/1969 | Weisbeck et al. | 423/623 |
| 3,528,770 | 9/1970 | Weisbeck | 423/623 |
| 4,043,813 | 8/1977 | Logue et al. | 96/1.8 |
| 4,060,415 | 11/1977 | Van Nunen et al. | 96/1.8 |
| 4,070,185 | 1/1978 | Kato et al. | 96/1.8 |
| 4,072,522 | 2/1978 | Miyatuka | 96/1.8 |

*Primary Examiner*—Harold Ansher

[57] ABSTRACT

Electrofax copy paper particularly for dry toner copiers comprises a substantially nonconductive substrate in combination with a photoconductive zinc oxide coating having greater light sensitivity, lower charge characteristics and greater conductivity than conventional zinc oxide coatings. The substrate does not include any additives specifically for increasing its conductivity but relies on a balanced conductivity from front-to-back as a result of an even distribution of moisture throughout the substrate.

2 Claims, No Drawings

DRY TONER ELECTROFAX PAPER

BACKGROUND OF INVENTION

The present invention relates generally to Electrofax copy paper, and more particularly, to Electrofax copy paper suitable for use in dry toner, pressure fused photocopy machines such as those marketed by 3M Company under the tradename "VQC".

The Electrofax printing process preferably utilizes a paper substrate coated with a photoconductive zinc oxide coating that is normally an insulator in the dark. In the printing process, a blanket electrostatic charge is first applied to the photoconductive insulating layer. The charge may be stored on the surface for a time in the dark. The rate at which this stored charge is dissipated when kept in the dark is referred to as the dark decay rate. Within the period in which a substantial charge remains, a light image is focused on the charged surface, discharging the portions of the surface irradiated with light, leaving the remaining imaged areas in a charged condition and thereby forming an electrostatic image thereon. The electrostatic image is rendered visible by applying to the electrostatic image a developer substance, such as a pigmented thermoplastic resin powder toner. In the dry toner copiers, the toner is fused to the image with the aid of heat and pressure as the image sheet is passed between two steel rollers to fix the image thereon.

Conventional Electrofax paper comprises a multiple coated paper substrate with barrier and conductive coatings over which is applied a photoconductive zinc oxide coating. Electrofax basestock, as supplied to the coater where the photoconductive coating is applied, will generally include a treatment or treatments for conductivity and solvent holdout for a typical solvent based photoconductive coating.

Current methods of manufacture include building up conductivity in the paper substrate and then barrier coating as separate operations, or, saturating the paper substrate for both conductivity and barrier properties in one operation. It is generally believed by the industry, that, with paper as a substrate, both solvent holdout and conductivity is required in order to design an operable Electrofax copy sheet. This conclusion is amply supported in the literature as exemplified by the following list of prior art references, which is by no means intended to be complete. Moreover, there are no known literature references which contradict this conclusion.

U.S. Pat. No. 2,979,402
U.S. Pat. No. 3,116,147
U.S. Pat. No. 3,639,162
U.S. Pat. No. 3,672,982
U.S. Pat. No. 3,798,032
U.S. Pat. No. 3,870,559
U.S. Pat. No. 3,887,496
U.S. Pat. No. 3,907,738
U.S. Pat. No. 3,953,374
U.S. Pat. No. 3,971,680
U.S. Pat. No. 4,007,148
T.A.P.P.I. December 1965, Vol. 48, No. 12, pages 77A–82A
T.A.P.P.I. March 1974, Vol. 57, No. 3, pages 81–84
T.A.P.P.I. March 1974, Vol. 57, No. 3, pages 75–78
T.A.P.P.I. June 1975, Vol. 58, No. 6, pages 96–99

However, in accordance with the present invention, there is disclosed an Electrofax copy paper and method of manufacture which does not include the addition of any added ingredients to the basestock thereof especially for increasing its conductivity. The theory behind the preparation of Electrofax copy paper according to the present invention is related to a correlation between basestock conductivity and the conductivity of the photoconductive zinc oxide coating applied to the basestock.

SUMMARY OF INVENTION

When it was discovered that a conventional, highly conductive basestock with a conventional zinc oxide coating produced inferior printing performance in dry toner copiers, it was theorized that the problems with "blasting" and "galvanizing" of the printed image might be due to a non-uniformity of the application of conductive material to the basestock. In this case, "blasting" showed up as a halo effect around the dark areas, while "galvanizing" appeared as a non-uniform mottle in the printed areas. To overcome these problems, it was suggested that a substantially nonconductive basestock be adopted. It was thought that, with no additives in the basestock specifically for enhancing its conductivity, a more uniform substrate could be achieved having a balanced conductivity from front-to-back. This theory was substantiated when resistivity tests showed a difference in resistivity from front-to-back of about one order or magnitude for conventional Electrofax basestock, but no difference for a substantially nonconductive basestock. Moreover, with a conventional zinc oxide coating applied to the substantially nonconductive basestock, the "blasting" and "galvanizing" effects disappeared, but the print performance suffered in other respects, particularly with regard to the latitude of the zinc oxide coated sheets and a lack of contrast between the printed and unprinted areas. Accordingly, the photoconductive zinc oxide coating was reformulated to take into account the difference between the resistivity of the nonconductive basestock and that of the conventional conductive basestock. Thus, the present invention lies in the combination of a zinc oxide coating having greater light sensitivity, lower charge characteristics and greater conductivity than conventional zinc oxide coatings applied to a substantially nonconductive basestock to produce superior dry toner Electrofax copy paper.

The Electrofax copy paper of the present invention is particularly useful in dry toner copiers such as the "VQC" copy machine marketed by the 3M Company. Moreover, the paper described herein is also useful in dry toner copiers marketed by SCM Corporation, Sharp Company and other manufacturers of like equipment, and its performance is not affected by the differences in toner systems used by the various manufacturers.

In the preparation of the basestock of the present invention the paper substrate is preferably sizepressed with a starch/pigment formulation. The objective of the sizepress application is to obtain a holdout of about 50–60% using the Bruning Test. The Bruning Test for holdout is a partial penetration test and is more reliable than other solvent holdout tests because it uses as the penetrant a mixture of ingredients that is similar to those used in solvent based zinc oxide photoconductive coatings. The penetrant solution in the Bruning Test has a viscosity of about 30–60 centipoise and one visually observes the amount of material that passes through the sample sheet. That is, if 50% of the penetrant passes through the sheet, the holdout is 50%. If 40% of the solution passes through the sheet, the holdout is 60%. Obviously, the greater the holdout, the more suitable the sheet. However, copy paper sheets according to the present invention which have a holdout of at least about 50% have been found to produce acceptable prints. In the present invention, the basestock is sizepressed with a conventional flooded nip sizepress apparatus where the sheet passes through the nip at a slight angle. Of course, either a horizontal or vertical sizepress or any other similar equipment would produce satisfactory results. The desired pickup at the sizepress by the basestock is in the range of about 3–4 lbs/ream (ream size 500 sheets measuring 25 × 38 inches). Depending upon the type, speed and drying capacity of the papermachines on which the basestock is made, one or more additional steps could be required to achieve the desired final sheet characteristics.

After drying and calendering and before the solvent based photoconductive zinc oxide coating is applied to the basestock, it should have a moisture content in the range of from about 3.5–6%. The moisture content of the basestock leaving the supercalender should not be lower than 3.5% in order to achieve satisfactory results. After supercalendering, the basestock is solvent coated with a photoconductive zinc oxide formulation which is more light sensitive, has a greater conductivity and lower charge characteristics than conventional zinc oxide coatings. Thus, the preparation of Electrofax copy paper according to the present invention is related to a correlation between basestock conductivity and the conductivity of the photoconductive zinc oxide coating. Because the basestock does not include any additives specifically for enhancing its conductivity, it has a balanced conductivity from front-to-back, presumably as a result of an even distribution of moisture throughout the substrate. The balanced conductivity and lack of conductive material in the substrate plays an important role in the success of the present invention by reducing the "blasting" and "galvanizing" problems inherent in prior art Electrofax copy sheets. These phenomena are believed to result from discontinuities in the application of conductive materials to the basestock. In addition, the reformulated zinc oxide coating of the present invention takes into account the higher resistivity of the nonconductive basestock by providing a more light sensitive surface with lower charge characteristics and greater conductivity than prior art zinc oxide coated paper.

DETAILED DESCRIPTION

The present invention relates to Electrofax copy paper and to a method of preparing Electrofax copy paper characterized by the combination of a substantially nonconductive basestock and a photoconductive zinc oxide coating which has a greater conductivity than conventional zinc oxide coatings. The invention is based on the discovery that for dry toner copy systems, a generally nonconductive basestock is required in order to reduce or eliminate the phenomena of "blasting" and "galvanizing" of the printed image. Moreover, the invention takes into consideration a correlation between the generally lower conductivity of a substantially nonconductive basestock and the need for generally higher conductivity of the photoconductive coating applied to Electrofax paper for dry toner systems. One of the keys to the present invention is believed to lie in the fact that where no materials are added to the basestock specifically for increasing its conductivity, a more balanced substrate is obtained, with uniform conductivity due in part to a more even distribution of moisture throughout the substrate than can be obtained when conductive materials are added. Another key to the invention is believed to lie in the discovery that for dry toner systems, the final zinc oxide coated Electrofax sheets must have a higher surface conductivity when exposed to light than conventional Electrofax copy paper to offset the reduced conductivity of the substantially nonconductive basestock.

The basestock of the present invention is preferably sizepressed only with a sizepress formulation comprising starch and pigment to achieve a solvent holdout of about 50% according to the Bruning test. There are no additional film formers, conductive polymers or salts added to the basestock to enhance its conductivity, and after calendering, the basestock is coated with a photoconductive zinc oxide coating formulation that is compatible with and compensates for the substantially nonconductive nature of the basestock.

In a typical example, the basestock of the present invention is prepared from wood pulp on a papermachine at a basis weight of from about 43–47 lb/ream (ream size, 500 sheets 25 × 38 inches). The basestock is treated with a sizepress formulation comprising water, starch and pigment at about 12–16% solids in a flooded nip device wherein from about 3–4 lb/ream pickup is obtained to achieve a holdout of at least about 50% as measured by the Bruning penetration test. Off machine, the moisture content of the basestock is in the range of from about 3.5–6%, and the basestock has a SER (surface electrical resistivity) in the range of from about $10^9$ to $10^{14}$ ohms per square. After supercalendering, the basestock is applied with a photoconductive zinc oxide coating in the amount of from about 12–25 lb/ream coat weight. The SER in the light of the final coated sheets is in the range of from about $10^9$ to $10^{11}$ ohms per square, which results in a final Electrofax copy sheet having greater conductivity than prior art Electrofax copy sheets.

The following example illustrates the present invention without limiting the scope thereof.

EXAMPLE I

An Electrofax basestock having a basis weight of about 44 lb/ream was prepared on a papermachine with wood pulp and treated with a size-press formulation comprising 84% water, 4% clay pigment and 12% starch at a solids content of about 16%. The sizepress device was of the conventional flooded nip type and the basestock pickup at the sizepress was about 3–4 lb/ream. After winding, the basestock was supercalendered 5 nips to achieve the desired final moisture content, holdout and other physical specifications. Table I shows the final paper specifications.

Table I

| Basestock Specifications | | | | |
|---|---|---|---|---|
| Basis Wt. # ream | Surface Resistivity Ohms/square | | Moisture % | Holdout Bruning % |
| | 20% R.H. | 65% R.H. | | |
| 44–45 | W $3.2 \times 10^{13}$ | $3.4 \times 10^{10}$ | 4.5–4.8 | 50 |
| | F $3.2 \times 10^{13}$ | $3.7 \times 10^{10}$ | | |

After supercalendering the basestock was coated using an off machine coater with a photoconductive zinc oxide coating comprising the following formulation:

| | | |
|---|---|---|
| A. | MEOH (solvent) | 30 lbs. |
| B. | Toluene (solvent) | 550 lbs. |
| C. | AROTAP 3217 (Tradename for a modified hydroxy-functional acrylic solution resin polymer manufactured by Ashland Chemicals, Columbus, Ohio) | 20 lbs. |
| D. | Photox 80 (Tradename of photoconductive zinc oxide manufactured by New Jersey Zinc Co.) (Grind 10 minutes to a Hegman of 5, then add E, F, G) | 1000 lbs. |
| E. | Ashland 3217 (see above) | 190 lbs. |
| F. | DeSoto 310 (Tradename for a binder manufactured by DeSoto, Inc.) | 90 lbs. |
| G. | Rinse (Toluene and residue of resins) (Grand total mixture for additional 2 minutes) | 35 lbs. |

The photoconductive coating formulation was applied to the basestock in an amount of about 12–25 lb/ream to produce an Electrofax paper suitable for use in Electrofax copiers using dry toner systems. Out-of-package tests of the sheeted Electrofax paper prepared above produced clear and sharp images over a wide range of humidity conditions without any noticeable effects from "blasting" or "galvanizing" in the image and non-image areas.

The uniform and balanced moisture content of the basestock in conjunction with the use of a photoconductive coating which has low charge characteristics is believed to be the key to the success of the present invention. The solvent holdout characteristics of the basestock are developed at the sizepress using only starch. In this manner, the cost of manufacture of the basestock is greatly reduced and its reproduceability is enhanced. In addition, it is believed that this step is the key to elimination of the "galvanizing" and "blasting" problems inherent in competitive products.

With respect to the contribution of the photoconductive coating, the Ashland Chemicals AROTAP 3217 resin offers outstanding light decay rate properties. In this regard, other resins of the same or a different class having substantially the same characteristics as the Ashland material would be suitable for the present invention. The conductive nature of the photoconductive zinc oxide coatings prepared with the Ashland resin controls the charge to a level at which the phenomena of "blasting" is reduced and the latitude of the sheet is improved. Meanwhile, the light sensitivity and speed of the photoconductive zinc oxide coatings containing the resin system controls the amount of background on the printed sheets and provides superior, print quality. Table II includes data to demonstrate the light decay characteristics of Electrofax copy sheets prepared according to the present invention as compared with those of two competitive sheets.

Table II

| | SER at 20% R.H. - (ohms/square) | | | |
|---|---|---|---|---|
| Sample | In Light | Dark 15 min. | Dark 1 hr. | Dark 24 hrs. |
| A-1 | $9.6 \times 10^{9}$ | $1.8 \times 10^{11}$ | $1.1 \times 10^{12}$ | $1.9 \times 10^{13}$ |
| A-2 | $6.4 \times 10^{10}$ | $3.8 \times 10^{12}$ | $1.2 \times 10^{14}$ | $1.9 \times 10^{14}$ |
| B-1 | $3.8 \times 10^{12}$ | $6.4 \times 10^{13}$ | $2.7 \times 10^{14}$ | $6.4 \times 10^{14}$ |
| B-2 | $1.3 \times 10^{12}$ | $9.6 \times 10^{12}$ | $1.2 \times 10^{14}$ | OFF SCALE |
| C-1 | $2.9 \times 10^{10}$ | $1.8 \times 10^{11}$ | $1.1 \times 10^{12}$ | $1.5 \times 10^{13}$ |

Table II-continued

| | SER at 20% R.H. - (ohms/square) | | | |
|---|---|---|---|---|
| Sample | In Light | Dark 15 min. | Dark 1 hr. | Dark 24 hrs. |
| C-2 | $6.4 \times 10^{11}$ | $8.0 \times 10^{12}$ | $1.9 \times 10^{14}$ | $1.9 \times 10^{14}$ |

The samples identified by the letter A are samples of Electrofax paper prepared according to the present invention, while samples B and C are competitive paper products. It will be seen from the data in Table II that, in general, the Electrofax paper prepared according to the present invention has a lower resistivity, or a greater conductivity in the light than the competitive papers. The greater conductivity is required to compensate for the substantially lower conductivity of the basestock of the present invention and for the purpose of achieving superior prints. However, under dark conditions, the samples are substantially equivalent.

In order to further demonstrate the higher conductivity of the zinc oxide coatings required for the present invention, pigmented drawdowns were made on glass using the preferred AROTAP 3217 resin of the present invention and a typical resin DeSoto E-310 used in the prior art. The results of those tests are shown in Table III.

Table III

| | Zinc Oxide Coating Specifications | |
|---|---|---|
| Sample | SER ohms/square | |
| | 20% R.H. | 65% R.H. |
| E-310 | $1.9 \times 10^{11}$ | $1.6 \times 10^{11}$ |
| AROTAP 3217 | $6.4 \times 10^{10}$ | $8.0 \times 10^{10}$ |

The data in Table III shows that for the present invention, the preferred zinc oxide coatings should have a surface resistivity less than about $10^{11}$ ohms per square. It will be noted that the coating containing the previously used DeSoto resin has a generally higher resistivity and thus less conductivity than the preferred coating herein when the coatings are applied on glass to eliminate any influence from the paper substrate.

Accordingly, the subject matter which applicant regards as his invention is particularly pointed out and distinctly claimed as follows:

I claim:

1. Electrofax paper for use in a pressure fixed dry toner copier, prepared from a basestock that is substantially nonconductive as a result of the absence of any conductive material specifically for increasing its conductivity, and coated with a photoconductive zinc oxide coating that has a higher than normal conductivity to compensate for the relatively nonconductive nature of the basestock, wherein:

(a) the basestock has an evenly distributed moisture content greater than about 3.5% and is treated with an aqueous sizepress formulation comprising starch and pigment in an amount of from about 3–4 lb/ream to achieve a surface resistivity on the order of from about $10^{9}$–$10^{14}$ ohm per square; and, (b) the basestock is overcoated on one side thereof with a resin system containing photoconductive zinc oxide coating having a surface resistivity less than about $10^{11}$ ohm per square in an amount of from about 12–25 lb/ream to produce a final zinc oxide coated paper having a surface resistivity in the range of from about $10^{9}$–$10^{11}$ ohm per square.

2. Electrofax paper according to claim 1 wherein the resin system consists essentially of a modified hydroxy functional acrylic polymer.

* * * * *